(12) United States Patent
Nakamura

(10) Patent No.: US 8,393,542 B2
(45) Date of Patent: Mar. 12, 2013

(54) METHOD AND APPARATUS FOR READING STACKED BAR CODE INFORMATION

(75) Inventor: Hiroshi Nakamura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 67 days.

(21) Appl. No.: 12/892,536

(22) Filed: Sep. 28, 2010

(65) Prior Publication Data

US 2011/0233279 A1   Sep. 29, 2011

(30) Foreign Application Priority Data

Sep. 29, 2009  (JP) ................. 2009-224577

(51) Int. Cl.
*G06K 19/06* (2006.01)
*G06K 7/10* (2006.01)
*G06K 9/18* (2006.01)

(52) U.S. Cl. ............ 235/462.16; 235/462.09; 235/462.1

(58) Field of Classification Search .......... 235/462.08–462.11, 462.16, 462.41
See application file for complete search history.

(56) References Cited

U.S. PATENT DOCUMENTS

| 5,304,786 | A | * | 4/1994 | Pavlidis et al. | 235/462.07 |
| 5,319,181 | A | * | 6/1994 | Shellhammer et al. | 235/462.09 |
| 5,471,533 | A | * | 11/1995 | Wang et al. | 380/51 |
| 5,631,457 | A | * | 5/1997 | Fukuda et al. | 235/462.1 |
| 7,380,718 | B2 | * | 6/2008 | Nakamura | 235/462.01 |
| 8,333,326 | B2 | * | 12/2012 | Nakamura | 235/462.16 |
| 2009/0194590 | A1 | * | 8/2009 | Thiyagarajah | 235/462.01 |
| 2012/0085823 | A1 | * | 4/2012 | Nakamura | 235/462.16 |

FOREIGN PATENT DOCUMENTS

| JP | 08-241369 | 9/1996 |
| JP | 09-022438 | 1/1997 |

* cited by examiner

*Primary Examiner* — Michael G Lee
*Assistant Examiner* — Suezu Ellis
(74) *Attorney, Agent, or Firm* — Frommer Lawrence & Haug LLP

(57) ABSTRACT

A method and an apparatus for reading stacked bar code information are provided which make it possible to shorten the processing time for reading the stacked bar code information. A plurality of conversion processes are disclosed for creating line width matrixes through measurement of the line width of bars and spaces of one column of the image data, by using each of a plurality of threshold values. A cluster number according to a line width matrix calculated through one of the plurality of conversion processes is then compared to a theoretical value of a cluster number of each row.

4 Claims, 11 Drawing Sheets

| LINE GROUP | CONSTITUENT LINES | JUDGMENT VALUE |
|---|---|---|
| S1 | L1, L2, L3 | 1 |
| .... | .... | .... |
| S15 | L15, L16, L17 | 1 |
| S16 | L16, L17, L18 | 0 |
| S17 | L17, L18, L19 | 0 |
| S18 | L18, L19, L20 | 0 |
| S19 | L19, L20, L21 | 1 |
| .... | .... | .... |
| S21 | L21, L22, L23 | 1 |
| .... | .... | .... |
| Sn-2 | Ln-2, Ln-1, Ln | 1 |

METHOD AND APPARATUS FOR READING STACKED BAR CODE INFORMATION

The present application claims priority from Japanese Patent Application No. 2009-224577 filed on Sep. 29, 2009, the disclosure of which is incorporated herein by reference in its entirety.

BACKGROUND OF THE INVENTION

1. Field of the Invention

The present invention relates to a reading method and a reading apparatus for optically reading stacked bar code information.

2. Description of Related Art

Conventionally up to now, bar codes are used prevailingly as a means in which a medium such as paper, a plastic material, and the like is provided with specific information and the information is automatically recognized. For example, one-dimensional bar codes are used for general consumer products. In the coming years, as a greater amount of information is requested for such a bar code, two-dimensional bar codes have appeared, being accompanied with their information capacity increased to be significantly greater than the one-dimensional bar codes have. Then, reading apparatuses available for those two-dimensional bar codes are also becoming widespread by degrees.

Among those two-dimensional bar codes, there is a type of bar code in which the information capacity is increased by means of stacking one-dimensional bar codes, and eventually this type of bar code is called the 'stacked bar code.' A typical kind of stacked bar code is a symbology system called PDF417, which is internationally standardized as 'ISO/IEC15438.'

Reading apparatuses are described, for example, in Japanese Unexamined Patent Application Publication No. H09-022438 (hereinafter "Patent Document 1") and Japanese Unexamined Patent Application Publication No. H08-241369 (hereinafter "Patent Document 2"). In the case of an apparatus for reading stacked bar code information disclosed in Patent Document 1, a two-dimensional image pickup device captures an image of a bar code at first. Then, having read code words as many as possible, the reading apparatus makes corrections so as to enable shortening a processing time. In the case of an apparatus for reading stacked bar code information disclosed in Patent Document 2, a two-dimensional image pickup device captures an image of a bar code for understanding the degradation state of the bar code.

In the case of the apparatus for reading stacked bar code information disclosed in Patent Document 1, the number of all code words constituting the bar code to be read is compared with the number of code words that have been read successfully. If the number of code words that have been read successfully is greater than the number based on a predetermined percentage, corrections are made. Meanwhile, if the number of code words that have been read successfully is less than the number based on the above percentage, the image pickup device captures another new image, which is then read. This process is repeated until the number of code words that have been read successfully exceeds the number based on the above percentage. Therefore, depending on the state of the medium, the condition for moving to the step of making corrections may not be satisfied, or a considerable number of retry operations as described above may be needed before satisfying the condition. Eventually, such a configuration that capturing an image takes much time unfortunately leads to a long processing time.

In the case of the apparatus for reading stacked bar code information disclosed in Patent Document 2, it is judged whether or not error corrections for the bar code have been made rightly. If making the error corrections finishes adequately, operation moves to a step of converting data. However, if the error corrections cannot be made, another image of the bar code is captured again. Therefore, in the case where the condition for making the error corrections is not likely satisfied due to a stain or distortion of the medium, the number of retry operations for capturing another image unfortunately increases to lead to a long processing time.

SUMMARY OF THE INVENTION

It is an object of the present invention to provide a method and an apparatus for reading stacked bar code information where the method and the apparatus make it possible to shorten the time for reading the stacked bar code information.

To achieve the object described above, provided in the present invention are a plurality of conversion processes for creating line width matrixes through measurement of the line width of bars and spaces of each row in one column of a captured image data. The present invention also provides a cluster number according to a line width matrix calculated through one of the plurality of conversion processes is compared to a theoretical value of a cluster number of each row.

It is further an object of the present invention to provide a method for reading stacked bar code information, by processing image data obtained through capturing the stacked bar code information recorded in a medium. The method includes a column identifying process for identifying a border part of columns of the stacked bar code information on the basis of the image data captured and obtained; a border determining process for determining a column border in each row on the basis of the border part of columns identified by the column identifying process; and a code word obtaining process for code word conversion by using the image data of an extent of each column on the basis of a result of the border determining process. In this method, the code word obtaining process has a plurality of conversion processes for creating line width matrixes through measurement of the line width of bars and spaces of each one column of the image data, by using each of a plurality of threshold values; and a cluster number according to a line width matrix calculated through one of the plurality of conversion processes is compared to a theoretical value of a cluster number of each row.

According to this aspect of the present invention, the image data obtained through capturing the stacked bar code information recorded in the medium, such as paper, a plastic material, and the like is processed software-wise to read out the stacked bar code information. Provided are the plurality of conversion processes for creating the line width matrixes through measurement of the line width of bars and spaces of one column of the image data captured and obtained, by using each of the plurality of threshold values. A cluster number according to a line width matrix calculated through one of the plurality of conversion processes is compared to a theoretical value of a cluster number of each row. Then, it can be judged which line width matrix is appropriate according to the cluster number of each of the plurality of line width matrixes that have been created.

Therefore, even in case where the image data of the stacked bar code includes brightness irregularity or any stain, a code word can be obtained by using any one of the plurality of line width matrixes that have been created. Then, without recapturing another image of the stacked bar code information, though recapturing another image was required conventionally, a processing time for reading the stacked bar code information can be shortened. Incidentally, a code word is a basic unit for encoding a numeric symbol, a character, any other symbolic value, or any other value related to the above characters.

It is further an object of the invention, according to the method for reading stacked bar code information discussed above, to provide a conversion process with a process of creating a line width matrix through measurement of the line width of bars and spaces, by using an averaged value of all image data composed of the line width of bars and spaces of one column as a first consistent threshold value, and to provide a process of creating a line width matrix, by using a 'n-th' consistent threshold value (the 'n' being an integer equal to or greater than '2'), the 'n-th'consistent threshold value being calculated in replacement of the first consistent threshold.

According to this aspect of the present invention, the first consistent threshold value and the 'n-th' consistent threshold value are constant values. Thus, those consistent threshold values can be obtained through one-time operation, and therefore the processing time can be shortened.

It is even further an object of the invention according to the methods for reading stacked bar code information discussed above, to provide a conversion process has a process of creating a line width matrix through measurement of the line width of bars and spaces, by using an averaged value of a maximum peak value of a bar and a minimum peak value of a space, the bar and the space being neighboring each other in the image data composed of the line width of bars and spaces of one column as a first local threshold value; and a process of creating a line width matrix, by using a 'm-th' local threshold value (the 'm' being an integer equal to or greater than '2'), the 'm-th' local threshold value being calculated in replacement of the first local threshold.

According to this aspect of the present invention, the first local threshold value and the 'm-th' local threshold value are detected by using a maximum peak value and a minimum peak value of a couple of a bar and a space, respectively, which are neighboring, and therefore, each of those local threshold values includes different values among multiple bars and spaces constituting the row. Accordingly, the width of bars and spaces can be detected precisely, even when there exists a variation in peak values due to brightness irregularity or any stain in the image data.

It is further an object of the present invention to provide an apparatus for reading stacked bar code information. According to this object of the invention, the apparatus includes an image pickup unit for capturing the stacked bar code information recorded in a medium; an image memory for storing image data of the stacked bar code captured by the image pickup unit; and a data processing unit having an architectural analysis section for analyzing an architecture of the stacked bar code on the basis of the image data; wherein the architectural analysis section creates a line width matrix through measurement of the line width of bars and spaces of one column of the image data, by using each of a plurality of threshold values.

According to this aspect of the present invention, even in case where the image data of the stacked bar code includes brightness irregularity or any stain, a code word can be obtained by using any one of the plurality of line width matrixes that have been created. Then, without recapturing another image of the stacked bar code information, though recapturing another image was required conventionally, a processing time for reading the stacked bar code information can be shortened.

The method and the apparatus for reading stacked bar code information according to the present invention enable reading the stacked bar code information without recapturing another image of the stacked bar code information so that a processing time can be shortened, even in case where the image data includes brightness irregularity or any stain.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
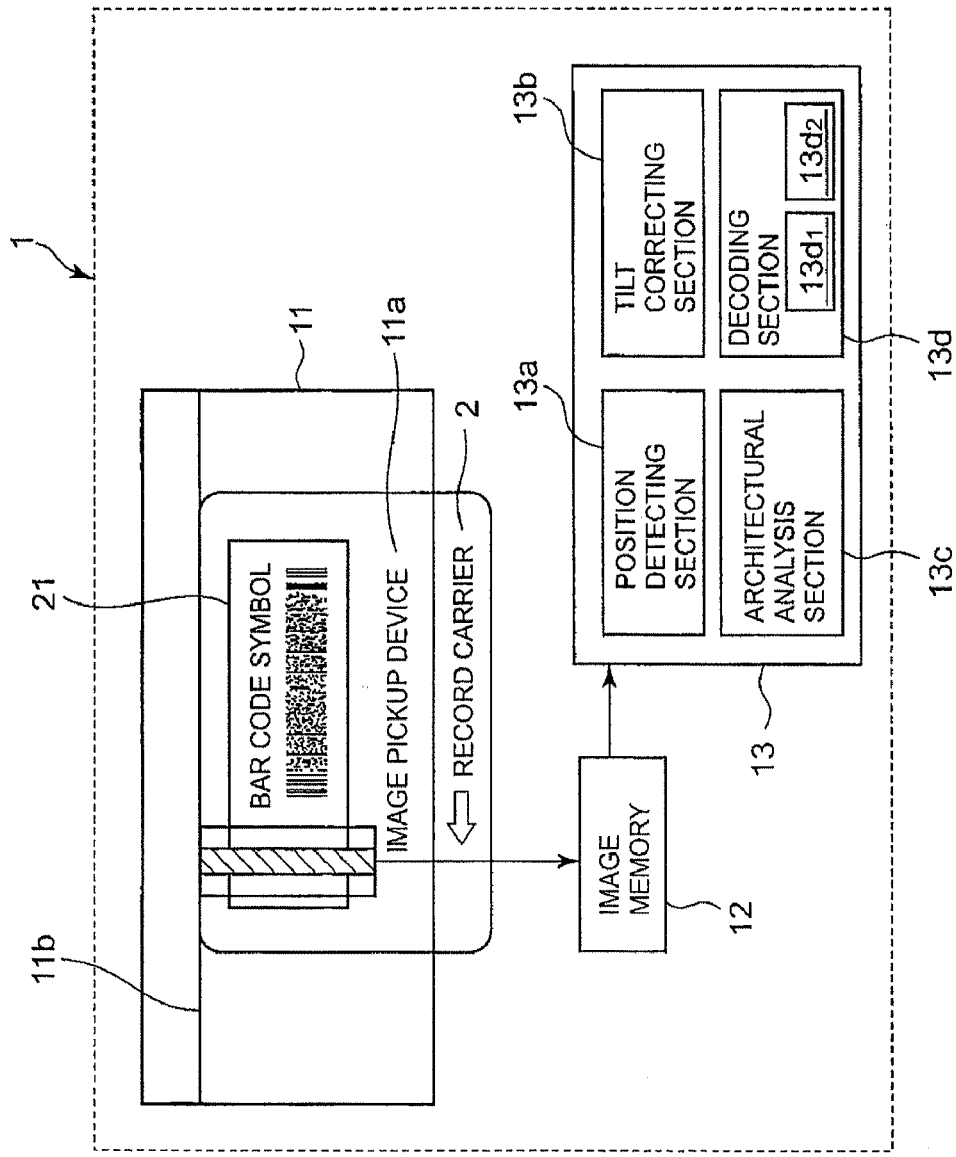
FIG. 1 is a block diagram showing an electrical configuration of an apparatus for reading stacked bar code information according to the embodiment of the present invention.

FIG. 1 is a block diagram showing an electrical configuration of an apparatus for reading stacked bar code information 1 according to the embodiment of the present invention.

As shown in FIG. 1, the apparatus for reading stacked bar code information 1 includes an image pickup unit 11, equipped with a contact image pickup device 11a and a card transfer mechanism 11b, an image memory 12, and a data processing unit 13. The data processing unit 13 includes a position detecting section 13a, a tilt correcting section 13b, an architectural analysis section 13c, and a decoding section 13d. In the meantime, a stacked bar code 21, being a two-dimensional bar code, is printed on a record carrier 2, such as a card and the like, provided with stacked bar code information. Furthermore, the decoding section 13d includes a low level decoding section 13d1 and a high level decoding section 13d2.

The image pickup device 11a of the image pickup unit 11 captures an image of the stacked bar code 21 printed on the record carrier 2, by means of photoelectric conversion. The image memory 12 stores the image data of the stacked bar code 21 captured by the image pickup device 11a. The data processing unit 13 retrieves the image data of the stacked bar code 21 from the image memory 12, and then treats the retrieved image data with various processing procedures.

Explained below is a method for reading stacked bar code information according to the embodiment of the present invention, using the apparatus for reading stacked bar code information 1 that is provided with the electrical configuration described above.

Method for Reading Stacked Bar Code Information

Figure 2:
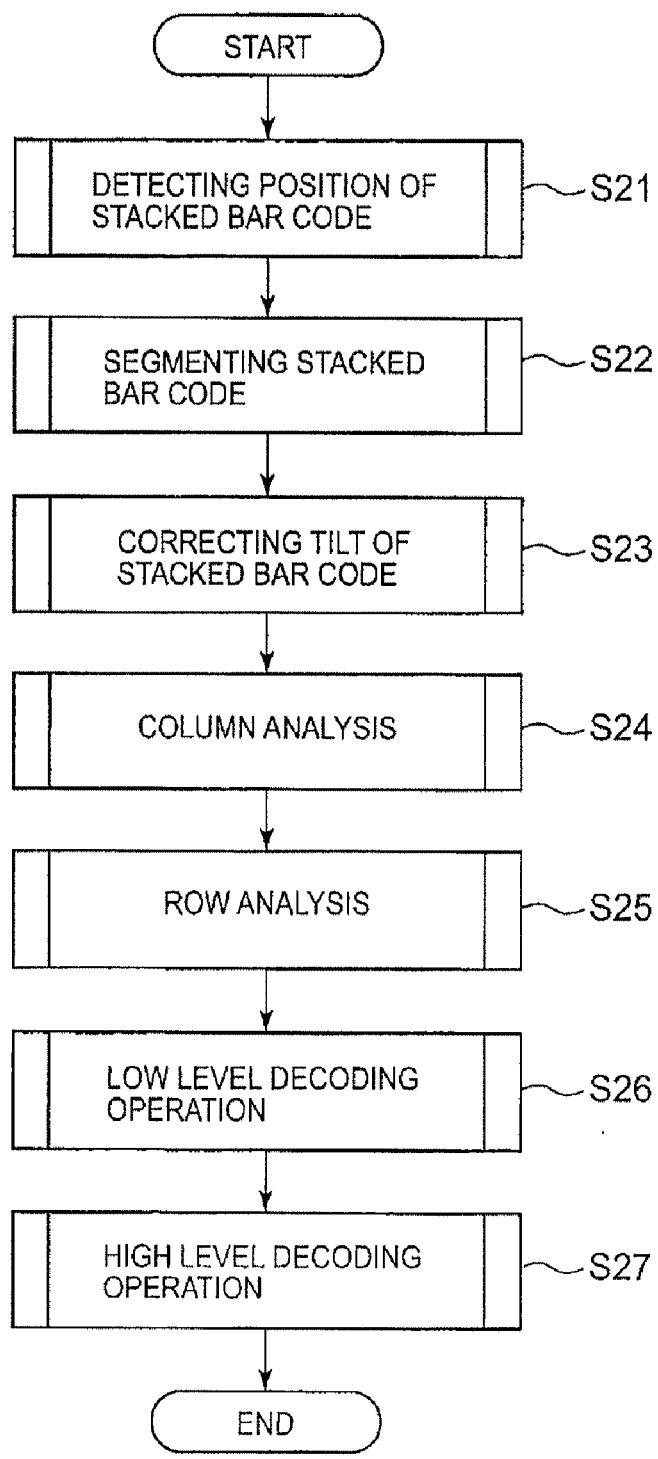
FIG. 2 is a flowchart showing a workflow of the method for reading stacked bar code information according to the embodiment of the present invention.

FIG. 2 is a flowchart showing a workflow of the method for reading stacked bar code information according to the embodiment of the present invention. A general explanation on the method for reading stacked bar code information according to the embodiment of the present invention is given below with reference to FIG. 2.

At first, a position of a stacked bar code is detected (Step S21). Specifically, the image pickup device 11a of the apparatus for reading stacked bar code information 1 captures an image of the stacked bar code 21 of the record carrier 2 by means of photoelectric conversion, while the record carrier 2 being transferred along the card transfer mechanism 11b to a predetermined position. Then the captured image data of the stacked bar code 21 is stored in the image memory 12. In this embodiment, the captured image data of the stacked bar code 21 is viewed as a matrix including a finite number of pixels, wherein a brightness value of each pixel (a pixel value) is expressed with a numeric value. The brightness value is expressed, for example, with an integer in the range from 0 to 255. The image memory 12 may be any one of memory devices that can store image data, such as a RAM, an SDRAM, a DDRS DRAM, and an RDRAM.

Afterwards, the position detecting section 13a of the data processing unit 13 reads out the image data stored in the image memory 12, and then detects a position of the stacked bar code 21 of the image data.

The stacked bar code 21, whose position has been detected in such a way as described above, is segmented (Step S22) in the data processing unit 13, and then the segmented image data is stored in the image memory 12.

Subsequently, a tilt of the stacked bar code 21 is corrected (Step S23) in the data processing unit 13. More specifically to describe, the tilt correcting section 13b of the data processing unit 13 reads out the image data segmented through Step S22, and converts the image data into corrected image data that is free of a tilt.

Next, architectural analysis operations are carried out (Steps S24 and S25) in the data processing unit 13. More specifically to describe, the architectural analysis section 13c of the data processing unit 13 analyzes an architecture of the stacked bar code 21 on the basis of the corrected image data converted through Step S23. Executed in the architectural analysis section 13c are a column analysis (Step S24) and a row analysis (Step S25).

Finally, decoding operations (Steps S26 and S27) are carried out in the decoding section 13d of the data processing unit 13. More specifically to describe, the decoding section 13d of the data processing unit 13 decodes the stacked bar code 21 on the basis of the architecture of the stacked bar code 21 analyzed through Steps S24 and S25. The low level decoding section 13d1 and the high level decoding section 13d2 of the decoding section 13d execute a low level decoding operation (Step S26) and a high level decoding operation (Step S27), respectively.

Figure 3:
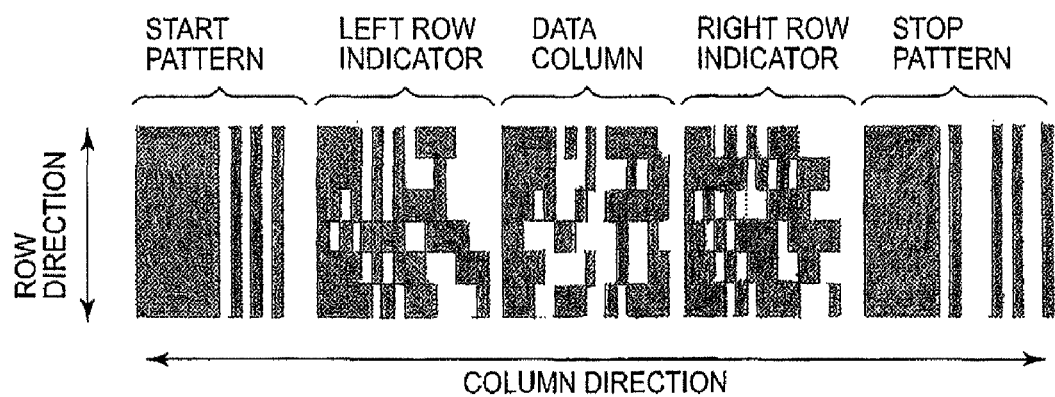
FIG. 3 shows an example of image data of a stacked bar code.

FIG. 3 shows an example of image data of the stacked bar code 21 captured in Step S21 described above. The stacked bar code 21 shown in FIG. 3 is a stacked bar code having a label architecture of PDF417 as a kind of stacked bar code.

In FIG. 3, wherein a vertical direction (a longitudinal direction) and a horizontal direction (a lateral direction) represent a row direction and a column direction, respectively; the stacked bar code 21 is divided into 5 sections broadly in the column direction. Namely, as shown in FIG. 3, the stacked bar code 21 is divided into 5 columns; i.e., a data column at the center, a left row indicator and a right row indicator at the left and right sides next to the data column, respectively, and moreover a start pattern and a stop patter further next to the left and right row indicators, respectively. A bar code structure of each column includes black parts called 'bars' and white parts called 'spaces.' In each of the start pattern and the stop pattern, there is formed a wide bar called a 'big bar.' In FIG. 3, a 'big bar' appears as a widest black bar placed at each left end in both the start pattern and the stop pattern.

Furthermore, in the stacked bar code 21 shown in FIG. 3, each of the three columns (the data column, the left row indicator, and the right row indicator) is composed of 6 rows in the row direction. Each of 3 columns, constituting each row, includes a code word. For example, the data column of the stacked bar code 21 includes 6 code words, i.e., a code word (for one column of the data column) multiplied by 6 rows. Incidentally, a code word is a basic unit for encoding a numeric symbol, a character, any other symbolic value, or any other value related to the above characters.

Figure 4:
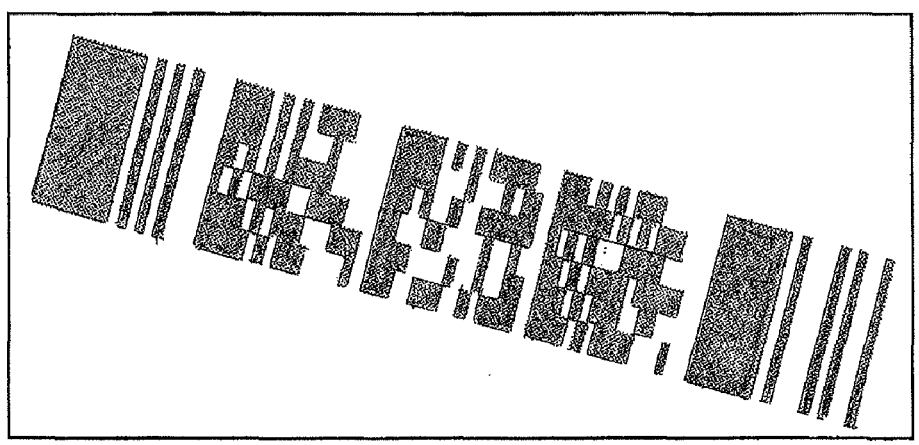
FIG. 4 shows a stacked bar code so captured as to be tilted by an image pickup device of an image pickup unit.

FIG. 4 shows a stacked bar code 21 captured, so as to be tilted, by the image pickup device 11a of the image pickup unit 11. When the image pickup unit 11 scans the stacked bar code 21, the row direction of the stacked bar code 21 does not always meet a direction perpendicular to the card transfer mechanism 11b. For example, as shown in FIG. 4, image data captured by the image pickup device 11a may sometimes be tilted. In other words, the row direction does not meet a perpendicular direction of the image data stored in the image memory 12. In such a case, decoding reliability of a conventional apparatus for reading stacked bar code information becomes worsened owing to a noise caused by quantization error. However, effects of such a noise can be suppressed according to the present embodiment. Procedures (Steps from S21 to S27) of the flowchart shown in FIG. 2 are described below in detail.

Position Detection

Figure 5:
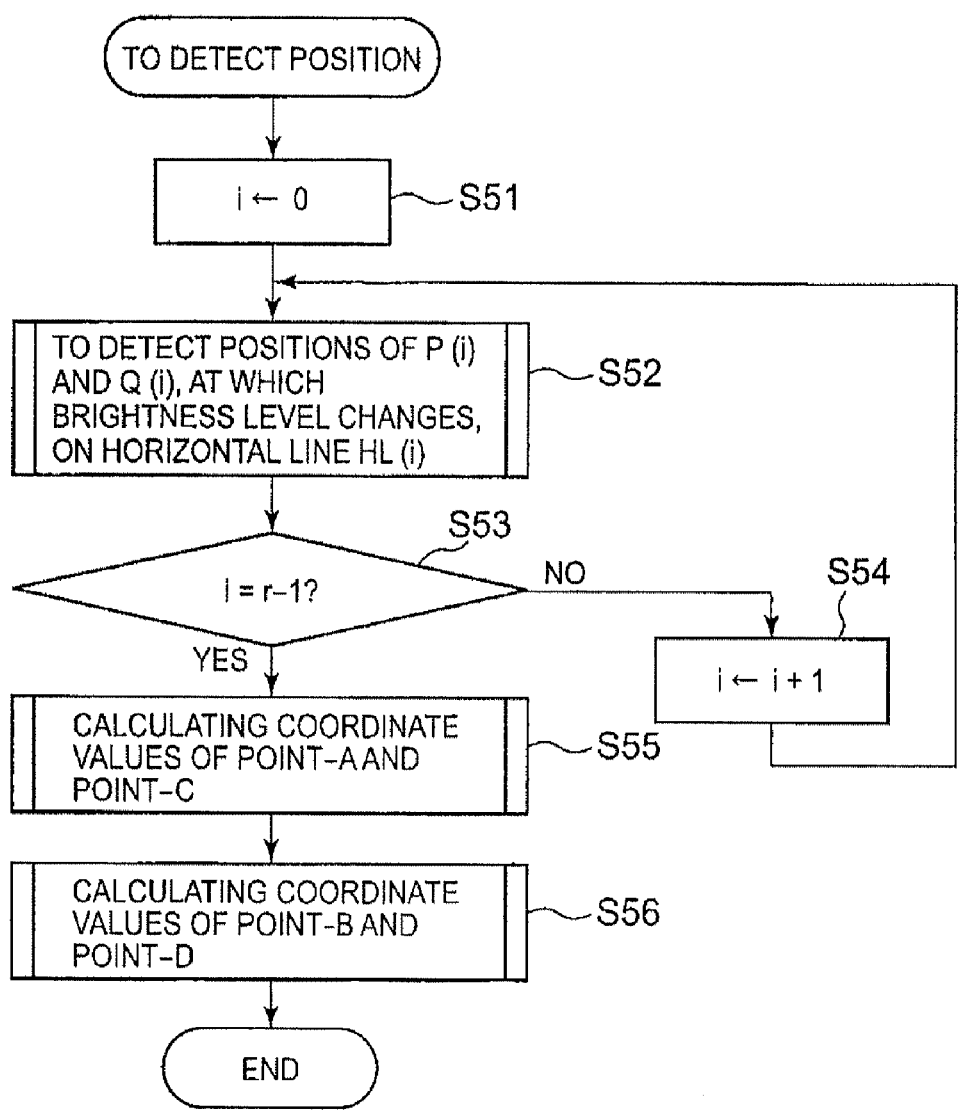
FIG. 5 is a flowchart showing a workflow of position detection in the flowchart shown in FIG. 2.
Figure 6:
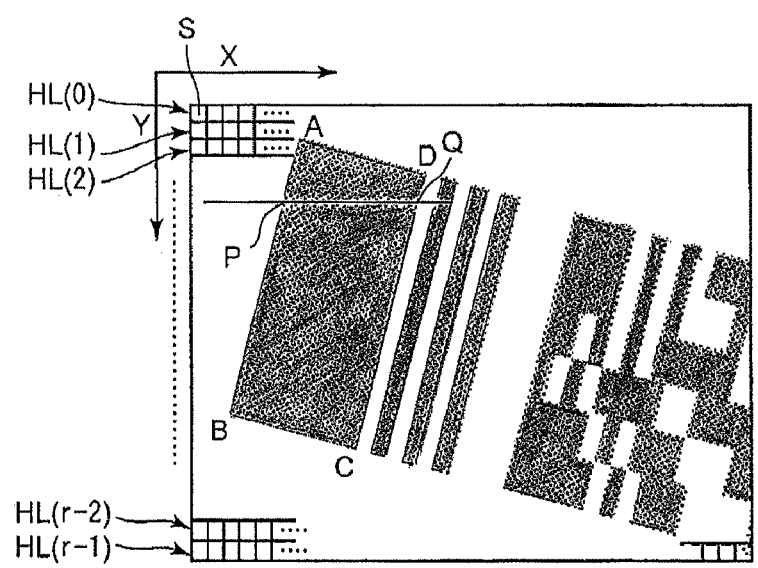
FIG. 6 is an enlarged view including a section of a big bar of a start pattern in a stacked bar code, and its surrounding area.

FIG. 5 is a flowchart showing a workflow of the position detection in the flowchart shown in FIG. 2. FIG. 6 is an enlarged view including a section of the big bar of the start pattern in the stacked bar code 21, and its surrounding area.

In FIG. 5, at first '0' is substituted into a variable T for initialization (Step S51).

Specifically, FIG. 6 shows an area surrounding a part of the stacked bar code of the image data stored in the image memory 12. An upper left end corner is defined with a pixel 'S', and a line in a horizontal direction (X) for the one pixel is defined as a horizontal line HL (0).

Then, an i-th horizontal pixel line from the horizontal line HL (0) in a vertical direction (Y-direction) is defined as a horizontal line HL(i) at Y=i. Image data of pixels in the X-direction on the horizontal line HL(i) is read out for searching for a point at which the image changes from 'bright' to 'dark' (the point being defined as 'point-P(i)'). Specifically to describe, pixels of the image data are sorted into two groups; i.e., one group of pixels, each of which has a brightness value greater than a predetermined threshold value so as to be 'bright' (a white part) (hereinafter referred to as a 'space'), and the other group of pixels, each of which has a brightness value smaller than a predetermined threshold value so as to be 'dark' (a black part) (hereinafter referred to as a 'bar'). Then, detected is a position of pixels where a 'space' is replaced with a 'bar'. Furthermore, on the same horizontal line HL(i), searched for next is a point at which the image changes from 'dark' to 'bright' (the point being defined as 'point-Q(i)'). Specifically, detected is a position of pixels where a 'bar' (a pixel representing 'dark') is replaced with a 'space' (a pixel representing 'bright') (Step S52).

Next, it is judged whether a condition of 'i=r−1' is satisfied or not (wherein, the 'r' is the number of lines (the number of pixels) in the Y-direction in FIG. 6) (Step S53). If it is judged that the condition is not satisfied yet, the T is incremented by 1 (Step S54) and then Step S52 is executed again. In the meantime, searching operation starts with the pixel 'S' shown in FIG. 6, and looks up a brightness value of each pixel in the X-direction. When the searching operation finishes for a pixel 'E' in a bottom line, it is judged that the condition of 'i=r−1' is satisfied. Thus, if it is judged that the above condition is satisfied, operation progresses to a next step S55. Incidentally, at this stage, there have been obtained 'n' couples of point combination (P(i), Q(i)) (wherein, the 'i' is 0, 1, . . . r−2, and r−1).

Then, coordinate values of a point-A and a point-C shown in FIG. 6 are calculated (Step S55). More specifically to describe, pixel positions corresponding to the point-A and the point-C are detected. Then, each distance in the X-direction, d(i)=|P(i)−Q(i)| is calculated so as to obtain a minimum value 'min (d(i))' among the distance values of d(i). The minimum value 'min (d(i))' corresponds to the point-A and the point-C of the big bar, at which the distance between the point-P and the point-Q becomes the shortest (Refer to FIG. 6). Accordingly, Y-coordinate values of the point-A and the point-C (positions of the corresponding pixels in the Y-direction) are 'Ay=min (i)' and 'Cy=max (i)', respectively. Meanwhile, X-coordinate values of the point-A and the point-C (positions of the corresponding pixels in the X-direction) are X-coordinate values of the point-Ps corresponding to each T so as to be an X-coordinate value of 'Ax=P(i=Ay)' and an X-coordinate value of 'Cx=P(i=Cy)', respectively.

Next, coordinate values of a point-B and a point D shown in FIG. 6 are calculated (Step S56). More specifically to describe, a range of T is identified, wherein the d(i) remains constant. Then, Y-coordinate values of the point-B and the point-D of the big bar are given as 'max (i)' and 'min (i)' within the range identified. Meanwhile, X-coordinate values of the point-B and the point-D are X-coordinate values of the point-P and the point-Q corresponding to each T so as to be an X-coordinate value of 'Bx=P(i=By)' and an X-coordinate value of 'Dx=Q(i=Dy)', respectively.

Through procedures of Step S51 to Step S56 in that way described above, coordinate values of 4 corners of the big bar; namely the point-A, the point-B, the point-C, and the point-D; (the coordinate values representing the positions of the pixels corresponding to the points) are identified. Then, a tilt angle can be calculated as 'a tan((Ay−Dy)/(Ax−Dx)).'

Incidentally, for improvement of the tilt detection, while exchanging the roles of the X-direction and the Y-direction each other in FIG. 6 to carry out the same procedures with the exchanged directions for calculating coordinate values of the 4 corners of the big bar; namely the point-A', the point-B', the point-C', and the point-D'; ultimate coordinate values may be identified by averaging each couple of corresponding values between the first coordinate values of the point-A, the point-B, the point-C, and the point-D and the second coordinate values of the point-A', the point-B', the point-C', and the point-D'.

As shown in FIG. 5, the coordinate values of the point-A and the point-C are calculated (Step S55), and then the coordinate values of the point-B and the point-D are also calculated (Step S56). The present invention is not limited to this arrangement; and alternatively, only coordinate values of the point-A and the point-C may be calculated for detection of the tilt angle.

Segmentation

After identifying the coordinate values of 4 corners of the big bar through the procedures of Step S51 to Step S56, the stacked bar code 21 is segmented.

Tilt Correction

Figure 7:
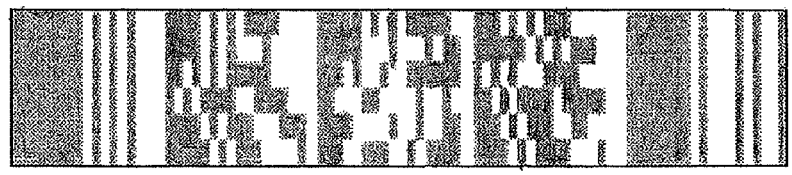
FIG. 7 shows corrected image data, being free of a tilt, after converting image data of a stacked bar code tilted with a certain tilt angle.

FIG. 7 shows corrected image data, being free of a tilt, after converting the image data of the stacked bar code 21 tilted with the tilt angle described above (=a tan ((Ay−Dy)/(Ax−Dx))). In other words, the tilt of the stacked bar code 21 shown in FIG. 7 is already corrected such that the column direction and the row direction of the stacked bar code 21 meet the horizontal direction (the X-direction) and the vertical direction (the Y-direction) in the area of the image memory 12 shown in FIG. 6, respectively.

Figure 13:
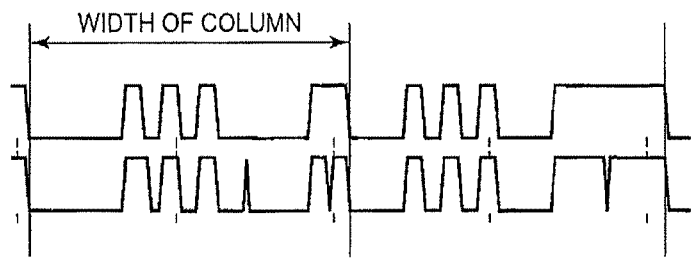
FIG. 13 is a waveform diagram of a part of waveforms showing the brightness values of pixels included in a row.

In FIG. 7, used for conversion into the corrected image data, being free of a tilt, is the tilt angle of the stacked bar code 21. The conversion can be carried out, for example, by means of the affine transformation. Then, in the method for reading stacked bar code information according to the embodiment of the present invention, interpolation or averaging operation is executed for the image after the coordinate conversion, for the purpose of smoothing operation to ease negative effects from quantization error that accompanies the coordinate conversion. Specifically, as shown in FIG. 10B and FIG. 13, brightness values of the pixels are so made as to represent a 'space' with a brightness value (for example, 100) and a 'bar' with a brightness value (for example, 0). The corrected image data is smoothed by using various filters such as, a median filter, an edge-preserving filter, a adaptive wiener filter, and a moving average filter.

Architectural Analysis

Figure 8:
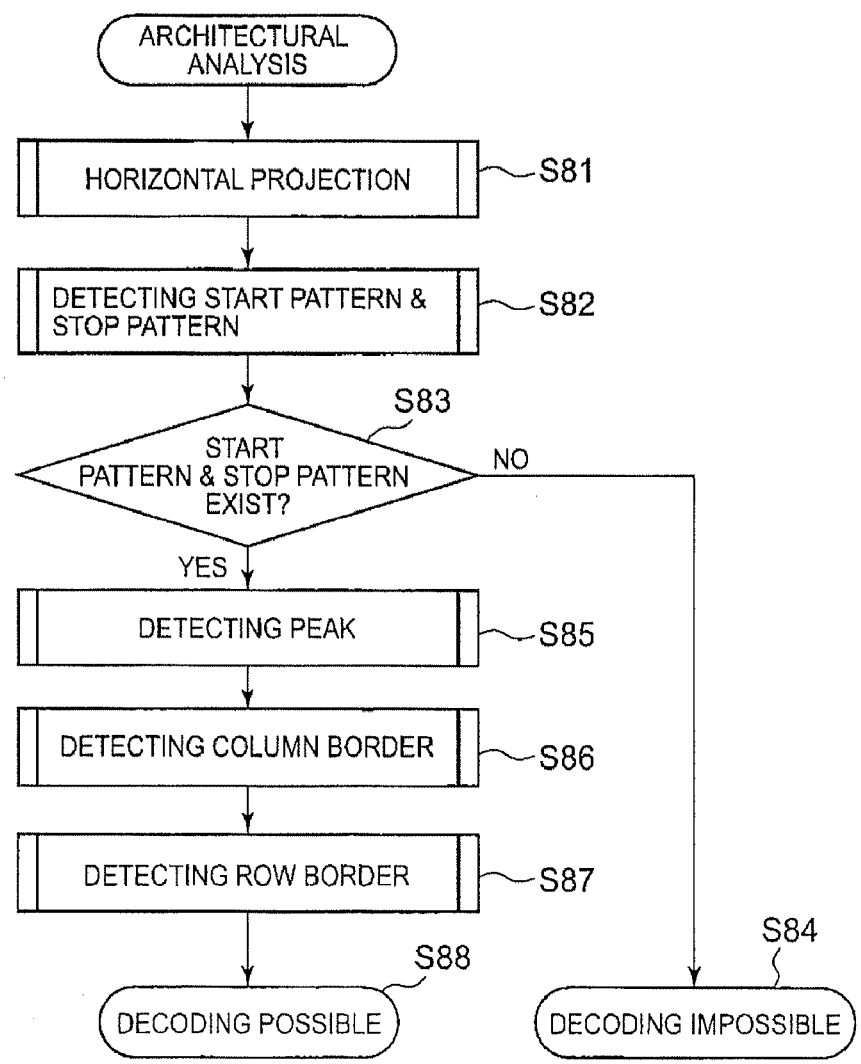
FIG. 8 is a flowchart showing a workflow of an architectural analysis shown in the flowchart of FIG. 2.

FIG. 8 is a flowchart showing a workflow of the architectural analysis (including the column analysis and the row analysis) shown in the flowchart of FIG. 2.

As shown in FIG. 8, horizontal projection is carried out at first (Step S81). Specifically, on the basis of the corrected image data of the stacked bar code 21 shown in FIG. 7, each sum of brightness values of all pixels arranged in each vertical direction is calculated, in relation to each of the pixels arranged in the horizontal direction, and then calculated sums are stored in the image memory 12.

Afterwards, by using the calculated total sums of brightness values, a difference between every two pixels neighboring in the horizontal direction is calculated. Then, using the difference values, an analysis on the start pattern and the stop pattern is executed (Step S82). As shown in FIG. 3 and so on, the start pattern and the stop pattern are different from the other code words; which are namely the data column, the left row indicator, and the right row indicator; and these patters are the same in all the rows (6 rows in the present embodiment). Therefore, executing the horizontal projection averages the start pattern and the stop pattern so that, being unlikely to be affected badly by brightness irregularity or any stain, the detection can be carried out stably.

Figure 9:
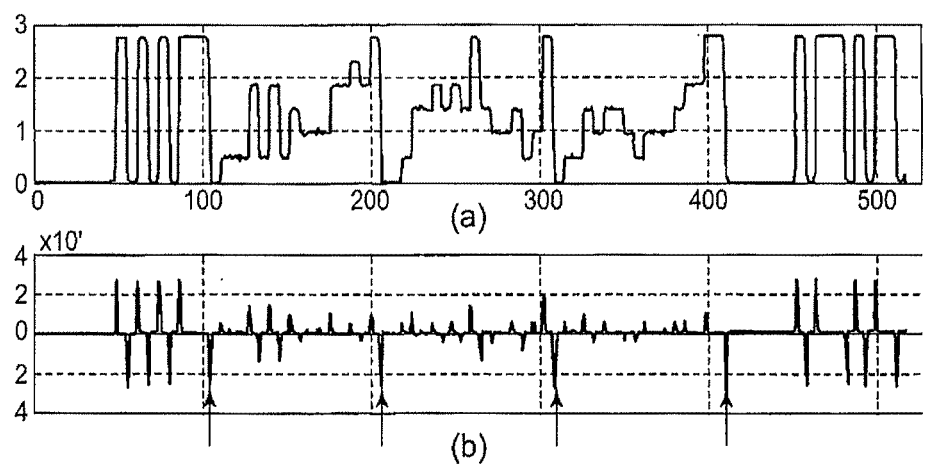
FIG. 9 shows a calculation result of a predetermined treatment on the corrected image data (Refer to FIG. 7).

FIG. 9 shows a result of the predetermined treatment on the corrected image data (Refer to FIG. 7). More specifically to describe, FIG. 9A is a graph of a calculation result of projection on each pixel in the vertical direction, in relation to the corrected image data (Refer to FIG. 7), and the graph shows a distribution of the sums of brightness values of all pixels in the row direction of the stacked bar code 21 in FIG. 3. FIG. 9B shows a result of difference calculation on the graph of FIG. 9A. Specifically, the graph shows a distribution of difference values, wherein each difference value between the sums of brightness of every two pixels neighboring in the horizontal direction is calculated in relation to the image data stored in the image memory 12. In this way, each position of pixels, where a bar (or a space) is replaced with a space (or a bar), can be detected on the horizontal line L(i).

The start pattern is detected by measuring a distance (run length) between positions, where a bar and a space are replaced with each other; namely by counting the number of pixels (hereinafter, called 'line width') in the horizontal direction, while making use of either graph shown in FIG. 9A and FIG. 9B. For example, obtained by measuring the line width of each bar and each space of the start pattern is an array of the line width described as "StartWork=[47, 6, 5, 6, 7, 6, 6, 18]." On the other hand, the proportion of length of bars and spaces in the start pattern is an array of the line width described as "StartMark=[8, 1, 1, 1, 1, 1, 1, 3]" according to PDF417 standards. At this point, for example, the normalized correlation 'R.' can be used as an index for checking the similarity between the above two arrays. Using the normalized correlation 'R' in relation to FIG. 9B results in "R=corrcoef (StartWork, StartMark)=0.9993", and therefore 'R' is sufficiently close to 1. Eventually, in this case, it is judged that the start pattern has been detected appropriately. Incidentally, the same explanation can be applied to the normalized correlation 'R' for the stop pattern as well, and therefore providing the same explanation is omitted here.

In this way, it is judged whether or not the start pattern and the stop pattern have been detected appropriately (Step S83). Then, if it is judged that both the patterns have been detected appropriately, operation progresses to Step S85. In the meantime, if it is judged that both the patterns have not been detected appropriately, it is assumed the bar code cannot be decode, namely decoding cannot be carried out, and operation ends (Step S84).

Though the normalized correlation 'R' is used for checking the similarity in the present embodiment, the present invention is not limited to this arrangement; and alternatively, for example, the sum of absolute differences, or the sum of products may be used instead, as required.

Next, peak detection is carried out in relation to the graph of FIG. 9B (Step S85). More specifically to describe, as shown in FIG. 3, a change from a space to a bar occurs in all the rows at each column border of the start pattern, the left row indicator, the data column, the right row indicator, and the stop pattern. Therefore, in the distribution of difference values of the horizontal projection, great difference values appear at those border sections (as indicated with upward arrows in FIG. 9B). To detect those difference values (peak values) indicated with the upward arrows in FIG. 9B, an adequate threshold value is determined. Then, depending on if an objective difference value exceeds the threshold value or not, it can be judged whether a peak exists there. If it is judged that the difference value represents a peak, the pixel position having the peak value is saved in the image memory 12.

Then, each column border is detected next (Step S86). More specifically to describe, according to each pixel position having a peak value saved in Step S85, borders of 5 columns including the start pattern, the left row indicator, the data column, the right row indicator, and the stop pattern are detected. Incidentally, an interval between neighboring two pixels having their peak values represents a width of the column, and the interval is also saved in the image memory 12. At this moment, if there exists a stain around a column border in a certain row, a change point representing a column border cannot appropriately be detected sometimes in scanning operation on each row. However, as being used in the present embodiment, the horizontal projection eases negative effects due to the stain through averaging operation so that those negative effects on detecting the column border can be suppressed.

Figure 10:
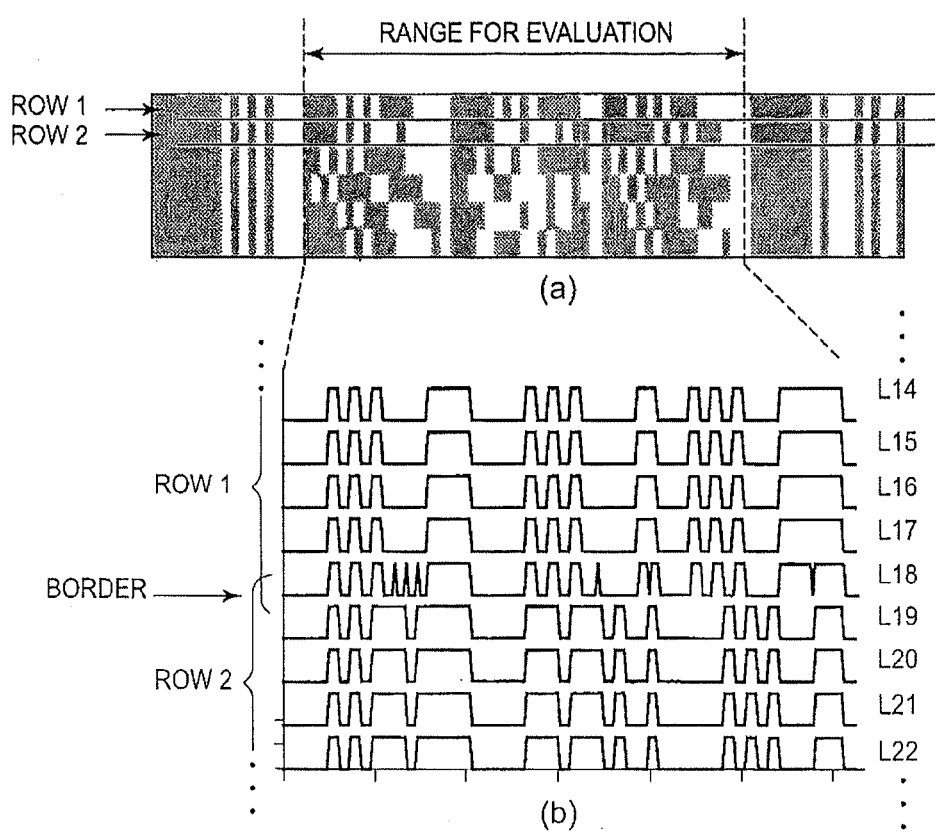
FIG. 10 includes a waveform showing pixel values on each line in the horizontal direction of corrected image data.
Figures 11, 12:
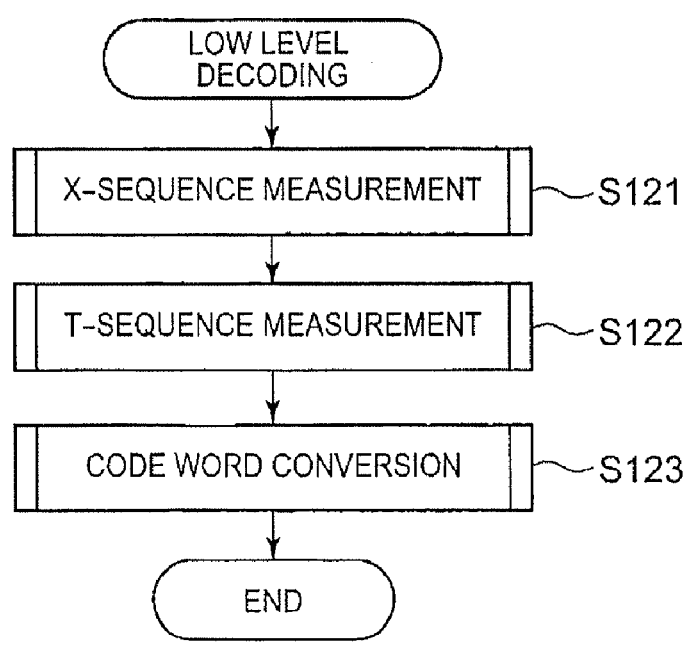
FIG. 11 is an explanatory drawing that describes a process of identifying each border between rows in a stacked bar code.
FIG. 12 is a flowchart showing a workflow of a low level decoding operation shown in the flowchart of FIG. 2.

Next, each row border is detected (Step S87). The detecting operation is explained more specifically with reference to FIGS. 10 and 11. FIG. 10 includes a waveform showing brightness values of the corrected image data, which has been averaged, on each line 'L' in the horizontal direction. FIG. 11 is an explanatory drawing that describes a process of identifying each border between rows in the stacked bar code 21. In the present embodiment, each line 'L' is composed of a matrix of "1 row×'n' lines," wherein 'n' represents a width of a range for evaluation.

In FIG. 10A, a group of consecutive multiple lines 'L's is specified at first on the corrected image data for detecting a row border. For example, a group (a line group S1) composed of 3 consecutive lines; L(1), L(2), and L(3) (hereinafter, abbreviated as L1, L2, and L3, respectively); is specified. Although a group is composed of 3 consecutive lines 'L's in the present embodiment, the present invention is not limited to the number of lines.

Next, when 2 lines out of the 3 lines 'L's are arbitrarily selected to calculate the normal correlation between the two lines, 3 correlation values in total (L1 & L2, L1 & L3, and L2 & L3) can be obtained. If a minimum one among the 3 correlation values is greater than a predetermined threshold value 'r0', it is judged that there exists a correlation among the 3 waveforms of L1, L2, and L3 (each representing brightness values of pixels in the corresponding line 'L') and the line group S1 composed of these 3 lines is provided with T. To the contrary, if the minimum value is smaller than the predetermined threshold value 'r0', it is judged that there exists no correlation at least between the waveforms of the two lines 'L's that have resulted in the minimum value, and the line group S1 is provided with '0'.

For example, in relation to the line group composed of the lines L1, L2, and L3 formed in the horizontal direction, all of the lines L1, L2, and L3 are included in the same row 1 (a highest row), as shown in FIG. 10B. Therefore, the minimum value among the 3 correlation values is greater than the threshold value 'r0', and then '1' is provided (a judgment value of the line group S1 is '1' in FIG. 11).

Then, the line group described above on the corrected image data is relatively moved in the row direction (in the vertical direction) (for considering a line group S2 composed of lines L2, L3, and L4, for example), and a matrix of correlation values is calculated. According to a judgment on whether a minimum value of the calculated matrix of correlation values is greater than the threshold value 'r0', the line group is provided with either '0' or '1' as a judgment value.

In the same manner, the same procedures (to provide a judgment value) described above are repeated down to a line group (Sn−2) composed of lines Ln−2, Ln−1, Ln, and eventually a matrix composed of 'n−2' sets of '1' and '0' in total is obtained (right end columns in FIG. 11).

If three lines 'L's are selected out of the same row, a line group composed of these three lines 'L's has a judgment value being close to '1'. If three lines 'L's are selected across two neighboring rows, a line group composed of the three lines 'L's has a relatively small judgment value. More specifically to describe with respect to FIG. 10B, lines 'L's higher than a line L18 are included in a row 1, and meanwhile, lines 'L's lower than the line L18 are included in a row 2. Namely, the line L18 is a line 'L' located at a border between the row 1 and the row 2.

Therefore, any line group including the line L18 has a judgment value being almost '0', and other line groups have a judgment value being '1' (Refer to FIG. 11). A line group having its judgment value being close to '0' represents a border part between rows. Then, scanning the matrix of judgment values to identify a location having its judgment value being close to '0' makes it possible to recognize a border part between rows. In the present embodiment, the mutual similarity among the lines 'L's is evaluated by using a correlation function. Therefore, as shown in FIG. 10A, any section such as the start pattern and the stop pattern, where each row has the same pattern (the line width of bars and spaces is the same), is excluded from an evaluation range so that meaningless calculation (i.e., meaningless calculation cost) can be avoided.

As described above, a row border is detected in Step S87 through a workflow of; "specifying the group of lines"->"calculation of the matrix of correlation values"->"comparing the minimum value of the matrix of correlation values with the threshold value"->"providing a judgment value of '0' or '1'"->"scanning the matrix of judgment values. This workflow is repeated down to an end line 'L' to detect each row border in relation with the row 1 to the row 6.

Having judged through detecting the row borders to enable a decoding operation, to which row each line of the corrected image data belongs, the procedures of the architectural analysis end (Step S88). Furthermore, in the present embodiment, brightness values at each point of multiple lines 'L's included in a row are averaged so as to decrease a local noise in each line 'L'. Moreover, the averaged brightness value for a pixel can be used for the decoding operation described later, as a value representing properties of the row. Through these procedures, accuracy of the decoding operation can be improved.

Low Level Signal Decoding Operation

FIG. 12 is a flowchart showing a workflow of the low level decoding operation (Step S26) shown in the flowchart of FIG. 2.

In the case of PDF417, which is one of stacked bar code standards, two steps of decoding operation, i.e., a low level decoding operation and a high level decoding operation, are executed. The low level decoding operation converts a code word composed of the line width of bars and spaces, which constitute one column, into interim information indicated by using a numeric character in the range from '0' to '928'. Then, the high level decoding operation decodes the interim information, once converted and indicated by using a numeric character in the range from '0' to '928', into an eventual language according to a prescribed rule. In the case of PDF417, used as the eventual language are ASCII characters, binary expressions, and other characters as well.

In FIG. 12, X-sequence measurement is executed (Step S121) at first. Generally, in the X-sequence measurement, a line waveform as a result of averaging a plurality of lines 'L's included in each row is scanned for line width measurement to obtain the line width of bars and spaces. Then, the line width data expressed with the number of pixels is converted into expression of module numbers so as to obtain an X-sequence. Incidentally, in this case, the lines to be scanned are a plurality of lines 'L's formed in each row almost around a middle part in the row direction, namely a matrix of pixels formed in a plurality of lines. Then, brightness values of pixels constituting the plurality of lines 'L's are averaged. The averaged brightness values of pixels are used for the decoding operation, as a waveform showing the brightness values of the pixels in the row.

FIG. 13 is a waveform diagram of a part of waveforms showing the brightness values of pixels obtained by scanning the line waveform as a result of averaging the plurality of lines 'L's included in a row. The line width of a bar and a space indicates a count value of pixels existing between two neighboring change points in the waveform showing the brightness values of pixels. In this case, each change point represents a location at which the waveform showing the brightness values of pixels intersects a level of a prescribed threshold value; the level of the threshold value being not indicated. A code of PDF417, which is one of stacked bar code standards, is composed of 5 columns; namely, a start pattern, a left row indicator, a data columns, a right row indicator, and a stop pattern, as shown in FIG. 3 and so on. Excluding the stop pattern, each of the other columns is composed of 4 bars and 4 spaces. Therefore, if the waveform showing the brightness values of pixels has no damage in its waveform curve, 8 sets of line width data in total are obtained, as shown in FIG. 13.

In the meantime, if the waveform showing the brightness values of pixels has any damage in its waveform curve, the waveform includes more than 8 sets of line width data (i.e., 9 sets), as shown in FIG. 13. In such a case, it is recognized that the column has some damage, and accordingly a flag is set for showing that the column has low reliability. After the above procedures are executed for all columns included in a certain row, the same procedures are executed again for a next row. The operation of Step S121 (Refer to FIG. 12) ends when the line width data of all the rows is obtained.

Next, line width normalizing operation is carried out. In the line width normalizing operation, the line width data expressed with the numbers of pixels representing the measured line width of bars and spaces is converted into an expression of the numbers of modules. One module corresponds to a minimum width of a bar or a space. Specifically, in the code of PDF417, which is one of stacked bar code standards, one column is composed of 17 modules. In the case where the line width data of one column is expressed as $W1$, $W2$, $W3$, $W4$, $W5$, $W6$, $W7$, and $W8$, and $Wc=W1+W2+W3+W4+W5+W6+W7+W8$, the normalized line width data is an X-sequence expressed as $Xi=Wi*17/Wc$ (wherein, $i=1, 2, \ldots, 7, 8$). An X-sequence of the left column shown in FIG. 13 is, for example, a line width matrix expressed as [5, 1, 1, 1, 1, 1, 5, 2] (A sum of these numbers is 17, which represents 17 modules described above).

Next, T-sequence measurement is executed (Step S122). Specifically to describe, the X-sequence is converted into a T-sequence, which is expressed by addition of neighboring two numbers, namely Xi and Xi+1. Converting the X-sequence of the left column shown in FIG. FIG. 13 into a T-sequence results in a line width matrix of [6 (5+1), 2 (1+1), 2 (1+1), 2 (1+1), 2 (1+1), 6 (1+5), 7 (5+2)].

In the end, code word conversion is executed (Step S123). More specifically to describe, a code word corresponding to the T-sequence calculated in Step S122 is retrieved from a predefined reference table. Namely, a low level decoding operation is executed so as to once convert the code word composed of the line width of 4 bars and 4 spaces, which constitutes one column, into interim information indicated in the range from '0' to '928'.

In the X-sequence measurement (Step S121) of the present embodiment, an optimal X-sequence can be chosen out of multiple X-sequences obtained by using a consistent threshold and a local threshold, in order to decrease a chance of erroneous judgment on the X-sequence.

Figure 14:
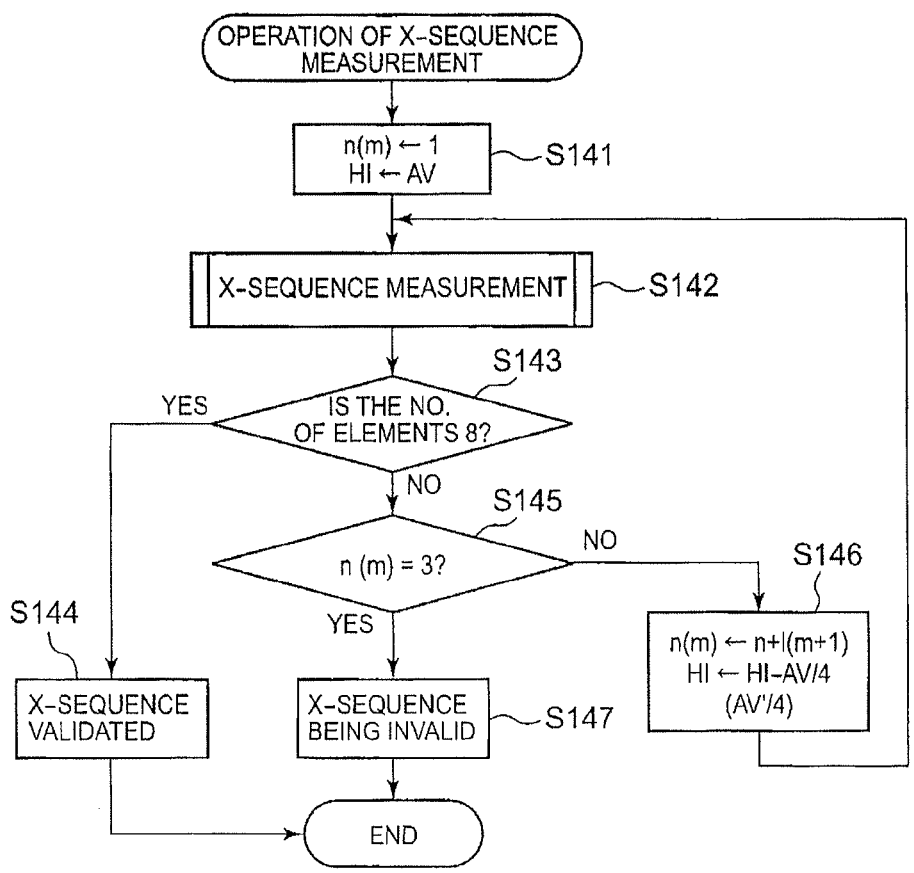
FIG. 14 is a flowchart showing a workflow of an X-sequence measurement.

FIG. 14 is a flowchart showing a workflow of the X-sequence measurement (Step S121) in the present embodiment. In the X-sequence measurement, as described above, scanned is the line waveform as a result of averaging the plurality of lines 'L's included in a row. If the brightness value measured at a pixel is greater than a predetermined threshold value 'H1', the pixel position is judged to be a space. Contrarily, if the brightness value measured at the pixel is smaller than the threshold value 'H1', the pixel position is judged to be a bar. In this way, each pixel position is judged to be a bar or a space. Furthermore, according to the judgment, the line width of bars and spaces is measured to create line width data. Since each column of a stacked bar code is composed of 4 bard and 4 spaces so that the number of elements included in one column is 8, the above procedures are repeated until the number of elements becomes 8. Then, the threshold value 'H1' is shifted.

In the present embodiment, initially a first consistent threshold AV (or a first local threshold AV') is specified as the threshold value 'H1' (Step S141) at the time of "n=1" (or "m=1"). The consistent threshold AV and the local threshold AV' are described later.

Then, the X-sequence is measured (Step S142) at the time of the first consistent threshold value 'H1'=AV (or the first local threshold AV'), and it is judged whether the number of elements is 8 or not (Step S143). If it is judged that the number of elements is 8 in Step S143, the X-sequence measurement is assumed to be successful. Then, the X-sequence at the time is validated (Step S144), and this subroutine ends. Contrarily, if it is judged that the number of elements is not 8 in Step S143, the threshold value 'H1' is changed. Then, it is judged whether the operation has already been repeated the number of predetermined times 'n' (or 'm') ('n' and 'm' are integers equal to or greater than 2) or not, for example, the number of operations has reached "n=3" (or "m=3") or not (Step S145).

If it is judged in Step S 145 that the number of operations has not reached "n=3" (or "m=3") yet, the number of predetermined times 'n' (or 'm') is incremented by 1. Then, in the present embodiment, a second consistent threshold value 'H2' is specified (Step S146) through subtracting "AV (or AV')/4" from the first consistent threshold value UV, and then the procedures of Step S142 and Step S143 are repeated. Incidentally, the value "AV (or AV')/4" is determined from experience, and the present invention is not limited to the value.

By using the second consistent threshold value 'H2' specified newly, the X-sequence is measured again (Step S142). Then, if it is judged that the number of elements is 8, the X-sequence at the time is validated (Step S144). Contrarily, if it is judged that the number of elements is not 8, the number 'n' (or 'm') is incremented by 1 because the number of operations has not yet reached "n=3" (or "m=3") (Step S145). Then, a third consistent threshold value 'H3' is newly specified (Step S146) through further subtracting "AV (or AV')/4" from the second consistent threshold value 'H2', and the X-sequence is measured again (Step S142) by using the third consistent threshold value 'H3'. In the present embodiment, if it is judged that the number of elements is not 8 even after repeating the above procedures for the number of predetermined times "n=3" (or "m=3"), it is judged that the X-sequence is invalid (Step S147), and this subroutine ends.

A Method by Using a Consistent Threshold Value AV

Figure 15:
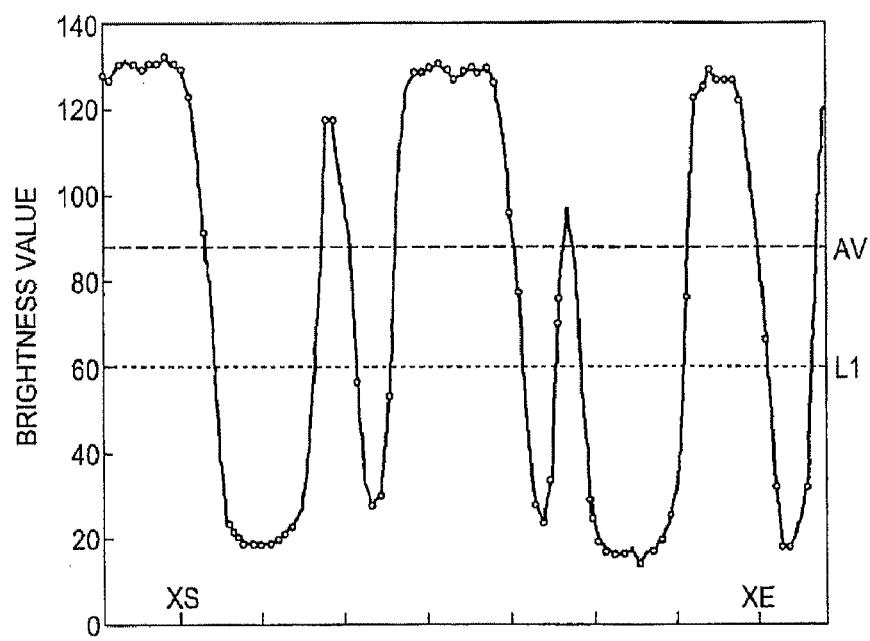
FIG. 15 is a drawing of part of a waveform showing brightness values in a row.

FIG. 15 is a drawing of part of a waveform showing brightness values of pixels obtained by scanning a line waveform as a result of averaging a plurality of lines 'L's included in a row, and the drawing shows a part that corresponds to a certain row and a certain column in a stacked bar code. It is judged whether each pixel is positioned in a bar or a space, depending on whether a brightness value of the pixel is greater or smaller than a first consistent threshold value AV. Specifically, if the number of all elements including bars and spaces detected within a range from a start point XS to an end point XE in a certain column is 8, the X-sequence is valid. In an example shown in FIG. 15, an X-sequence (the line width of bars and spaces) is measured by using a first consistent threshold value AV so that obtained is a line width matrix of [12, 6, 3, 18, 3, 4, 12, 11]. In this case, the first consistent threshold value AV is an average value of all image data, composed of the line width of bars and spaces, obtained by scanning the line waveform as a result of averaging operation on the certain row of the certain column. Specifically, in the row of the column shown in FIG. 15, brightness values of all pixels measured are summed up. Then, the consistent threshold value AV is specified with a value, obtained through dividing the sum by the number of all the pixels, namely the value being an averaged brightness value per one pixel. Therefore, the first consistent threshold value AV is a constant value, as shown in FIG. 15. Thus, the first consistent threshold value AV can be obtained through one-time operation, and therefore the processing time can be shortened.

A Method by Using a Local Threshold AV'

Figure 16:
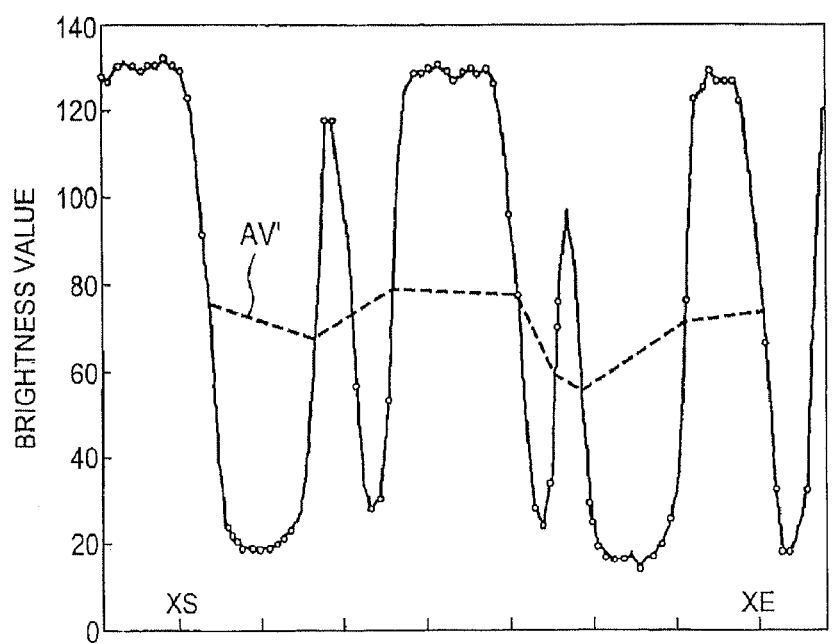
FIG. 16 is another drawing of part of a waveform showing brightness values in a row.

On the other hand, FIG. 16 is a drawing of part of a waveform showing brightness values of pixels obtained by scanning a line waveform as a result of averaging a plurality of lines 'L's included in a row, and therefore, the waveform itself is the same as that of FIG. 15. A local threshold AV' is specified with an average value between two peaks, i.e., an average value of a maximum peak value and a minimum peak value of the two neighboring peaks. The local threshold AV' is locally specified as shown in FIG. 16 with a dotted line. In the example shown in FIG. 16, an X-sequence is measured by using the local threshold AV' so that obtained is a line width matrix of [12, 5, 5, 16, 4, 4, 12, 10]. The local threshold AV' is detected by using a couple of a bar and a space that are neighboring, as shown in FIG. 16, and therefore, it includes different values among multiple bars and spaces constituting the row. Accordingly, the width of bars and spaces can be detected precisely, even when there exists a variation in peak values due to brightness irregularity or any stain in the image data.

Figure 17:
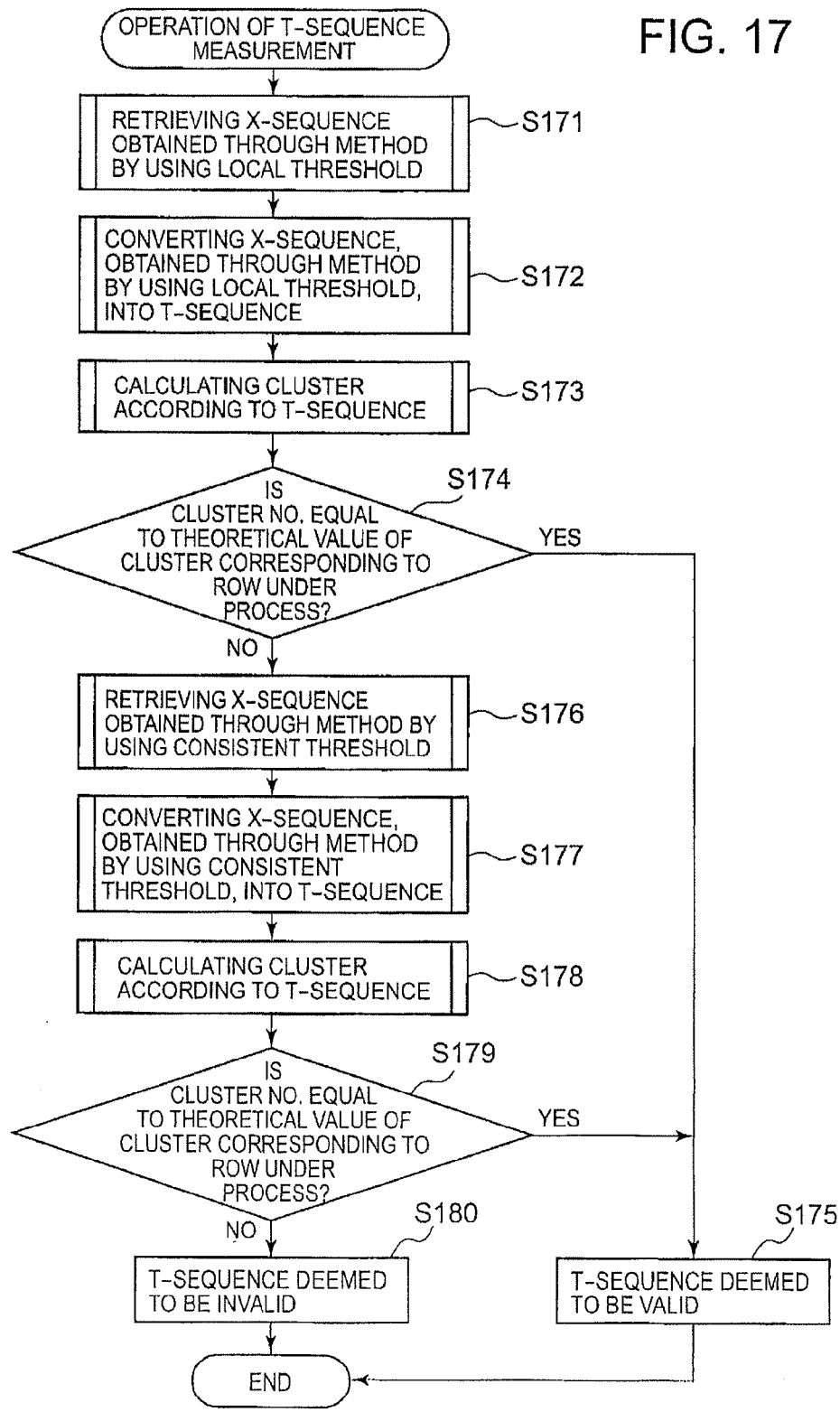
FIG. 17 is a flowchart showing a workflow of a T-sequence measurement.

FIG. 17 is a flowchart showing a workflow of the T-sequence measurement (Step S122) in the present embodiment. In the T-sequence measurement, X-sequences obtained through two threshold methods; i.e., one method by using a consistent threshold value and the other method by using a local threshold value; are individually converted into a T-sequence. Then, if a cluster number calculated according to each T-sequence is equal to a theoretical value of the cluster, the T-sequence is deemed to be valid. If not, the T-sequence is deemed to be invalid. Though the X-sequence obtained through the method by using a local threshold is executed at first, and then the other X-sequence obtained through the method by using a consistent threshold is done at second in the operation shown in FIG. 17, these operation steps may be reversed, if required.

In this case, cluster numbers are prepared for minimizing a chance of errors arising, e.g., in the stacked bar code 21 shown in FIG. 3. The cluster numbers exist in all the code words except the start pattern and the stop pattern. Specifically, according to PDF417 standards, cluster numbers appear repeatedly for every 3 lines alternately; i.e., used are a cluster number '0' for Row-1 (Line-0), a cluster number '3' for Row-2 (Line-1), and a cluster number '6' for Row-3 (Line-2). In other words, these cluster numbers '0', '3', and '6' are theoretical values of the cluster numbers.

Using specific values, an explanation is given below. At first, an X-sequence, obtained through the method by using a local threshold, is retrieved (Step S171), and it is converted into a T-sequence (Step S172). When the X-sequence being expressed as "X=[$X_i$, $X_{i+1}$, $X_{i+2}$ . . . ]", the T-sequence is calculated by addition of $X_i$ to $X_{i+1}$ that are neighboring each other. When the X-sequence, obtained through the method by using a local threshold, is expressed as "X=[12, 5, 5, 16, 4, 4, 12, 10]", the T-sequence converted results in a line width matrix of "T=[17, 10, 21, 20, 8, 16, 22]".

Next, a cluster number is calculated according to the T-sequence (Step S173). For calculating the cluster, the T-sequence is normalized through calculation of "TN(i)=T(i)*17/Wc(i=0, 1, . . . , 7)". In the case of the example described above, the calculation results in a line width matrix of "TN=[4, 3, 5, 5, 2, 4]". Then, by using a formula "Cluster number 'K'=(TN(0)−TN(1)+TN(4)−TN(5)+9) mod9" (wherein, 'mod9' is a residue after division by 9), the cluster number 'K' is calculated. In the case of the example described above, the calculation results in "K=(4−3+2−4+9)mod 9=8".

Then, it is judged whether the cluster number, calculated in Step S173, is equal to a theoretical value of the cluster number corresponding to the row that is under the process at the time (Step S174). When the row under the process at the time is a first line of the stacked bar code 21, the theoretical value of the cluster is '0'. Therefore, the cluster number '8' does not conform to the theoretical value of the cluster number '0', and then the T-sequence is deemed to be invalid, and operation progresses to Step S176. Contrarily, if the cluster number conforms to the theoretical value, the T-sequence is deemed to be valid (Step S175).

If the cluster number does not conform to the theoretical value in Step S174, an X-sequence, obtained through the method by using a consistent threshold, is retrieved (Step S176), and it is converted into a T-sequence (Step S177). Converting the X-sequence, obtained through the method by using a consistent threshold, into a T-sequence results in "T=[18, 9, 21, 21, 7, 16, 23]".

Next, a cluster number is calculated according to the T-sequence (Step S178). In the case of the example described above, normalization of the T-sequence results in "TN=[4, 2, 5, 5, 2, 4]" and "K=(4−2+2−4+9) mod 9=0".

Then, it is judged whether the cluster number, calculated in Step S178 is equal to a theoretical value of the cluster number corresponding to the row that is under the process at the time (Step S179). In the case of the example described above, the cluster number '0' conforms to the theoretical value of the cluster number '0', and therefore the T-sequence is deemed to be valid (Step S175). Contrarily, if the cluster number does not conform to the theoretical value, the T-sequence is deemed to be invalid (Step S180).

Thus, in the present embodiment, the method for reading stacked bar code information is provided with two threshold methods; i.e., one method by using a consistent threshold value and the other method by using a local threshold value. Therefore, even in case where the image data includes brightness irregularity or any stain, it is judged whether or not an X-sequence is appropriate, by comparing the cluster number obtained from the row being under the process at the time to the theoretical value, so as to enable obtaining an optimal X-sequence.

After obtaining an optimal X-sequence, a low level decoding operation is executed for code word conversion. Specifically, a code word corresponding to the T-sequence, which is deemed to be valid, is retrieved from a predefined reference table. In other words, the low level decoding operation is executed so as to once convert the code word composed of the line width of 4 bars and 4 spaces, which constitutes one column, into interim information indicated in the range from '0' to '928'.

High Level Signal Decoding Operation

When the code word conversion finishes, a commonly-used high level decoding operation is executed, and then all the decoding operation finishes. Then, decoded data together with the stacked bar code information and the like is output to a higher-level control device. Specifically, the high level decoding operation decodes the interim information, once converted and indicated by using a numeric character in the range from '0' to '928', into an eventual language according to a prescribed rule. In the case of PDF417, used as the eventual language are ASCII characters, binary expressions, and other characters as well.

As described above, according to the present embodiment, stacked bar code information can precisely be read out; and therefore, a high-precision method and apparatus for reading stacked bar code information can be configured and constructed without elongating a processing time. Namely, the line width of bars and spaces for 1 column is measured out of corrected image data that has been captured, by using a plurality of consistent threshold values or local threshold values so as to create a line width matrix. Then, through comparing a cluster number with a theoretical value of the cluster of each row on a plurality of line width matrixes, it can be judged which line width matrix is appropriate according to the cluster number of each of the plurality of line width matrixes that have been created.

Therefore, even in case where the captured image data includes brightness irregularity or any stain, a code word can be obtained by using any one of the plurality of line width matrixes that have been created. Then, the stacked bar code information can be read without recapturing another image of the stacked bar code information, though recapturing another image was required conventionally. Accordingly, a processing time for reading the stacked bar code information can be shortened.

Though the present invention is applied to a combination of a one-dimensional image pickup device and a linear transfer mechanism in this embodiment, the present invention is not limited to such an arrangement. For example, the present invention may also be applied to a combination of an area sensor such as a two-dimensional CCD or a CMOS imager, and an object supporting mechanism.

Furthermore, though a tilt of the image data itself obtained by capturing the stacked bar code information is changed in the tilt correction process described above so as to convert the image data into the corrected image data, being free of a tilt, the present invention is not limited to such an arrangement. As far as corrected image data being free of a tilt can be created eventually, any method can be applied; for example, turning an optical coordinate system to result in conversion into corrected image data that is substantially free of a tilt.

Additionally, through the present invention, reading stacked bar code information precisely can occur even where the stacked bar code image includes brightness irregularities or stains.

The reference numerals used herein refer to: Apparatus for reading stacked bar code information (1); record carrier (2); image pickup unit (11); image pickup device (11a); image memory (12); data processing unit (13); position detecting section (13a); tilt correcting section (13b); architectural analysis section (13c); and decoding section (13d).

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for reading stacked bar code information by processing image data obtained through capturing the stacked bar code information recorded in a medium, comprising:
   utilizing an apparatus for reading stacked bar code information to perform:
      a column identifying process for identifying a border part of columns of the stacked bar code information on the basis of the image data captured and obtained;
      a border determining process for determining a column border in each row of the stacked bar code on the basis of the border part of columns identified by the column identifying process; and
      a code word obtaining process for code word conversion by using the image data of an extent of each column on the basis of a result of the border determining process;
   wherein the code word obtaining process has a plurality of conversion processes for creating line width matrices through measurement of the line width of bars and spaces of each column of the image data, by using each of a plurality of threshold methods; and
   wherein a cluster number according to a line width matrix calculated through one of the plurality of conversion processes is compared to a theoretical value of a cluster number of each row.

2. The method for reading stacked bar code information according to claim 1;
   wherein one of the conversion processes has:
      a process of creating a line width matrix through measurement of the line width of bars and spaces, by using an averaged value of all image data composed of the line, width of bars and spaces of one column as a first consistent threshold value; and
      a process of creating a line width matrix, by using a 'n-th' consistent threshold value;
   wherein the 'n' being an integer equal to or greater than 2; and
   wherein the 'n-th' consistent threshold value being calculated in replacement of the first consistent threshold.

3. The method for reading stacked bar code information according to claim 1;
   wherein one of the conversion processes has:
      a process of creating a line width matrix through measurement of the line width of bars and spaces, by using an averaged value of a maximum peak value of a bar and a minimum peak value of a space, the bar and the space being neighboring each other in the image data composed of the line width of bars and spaces of one column as a first local threshold value; and
      a process of creating a line width matrix, by using a 'm-th' local threshold value;
   wherein the 'm' being an integer equal to or greater than 2; and
   wherein the 'm-th' local threshold value being calculated in replacement of the first local threshold.

4. An apparatus for reading stacked bar code information, comprising:
   an image pickup unit for capturing the stacked bar code information recorded in a medium;
   an image memory for storing image data of the stacked bar code captured by the image pickup unit; and
   a data processing unit having an architectural analysis section for analyzing an architecture of the stacked bar code on the basis of the image data;
   wherein the architectural analysis section creates, through a conversion process, a line width matrix through measurement of the line width of bars and spaces of one column of the image data, by using each of a plurality of threshold values methods; and
   wherein a cluster number according to the line width matrix created by the architectural analysis section, through the conversion process, is compared to a theoretical value of a cluster number of each row of the stacked bar code.

\* \* \* \* \*